United States Patent [19]

Slosiarek et al.

[11] 4,174,116
[45] Nov. 13, 1979

[54] ISOLATED STEP SUPPORT

[75] Inventors: Michael L. Slosiarek, Greenfield; Gregory A. Krieger, Brookfield, both of Wis.

[73] Assignee: Allis-Chalmers Corporation, Milwaukee, Wis.

[21] Appl. No.: 929,290

[22] Filed: Jul. 31, 1978

[51] Int. Cl.² ............................................. B60R 3/02
[52] U.S. Cl. .................................................. 280/163
[58] Field of Search .................. 280/163, 164; 182/89, 182/91

[56] References Cited

U.S. PATENT DOCUMENTS

| | | | |
|---|---|---|---|
| 3,244,433 | 4/1966 | Grigsby | 280/163 |
| 3,758,134 | 9/1973 | Stewart | 280/163 |
| 4,017,093 | 4/1977 | Stecker, Sr. | 280/163 |
| 4,053,172 | 10/1977 | McClure | 280/163 |
| 4,054,298 | 10/1977 | Urbaitis | 280/163 |

*Primary Examiner*—Robert R. Song
*Attorney, Agent, or Firm*—Arthur L. Nelson

[57] ABSTRACT

An isolated step mounted on an isolated cab of a tractor with stabilizer means isolating the step from the vehicle chassis and dampening vibrations primarily through shear stress of an elastomer.

10 Claims, 9 Drawing Figures

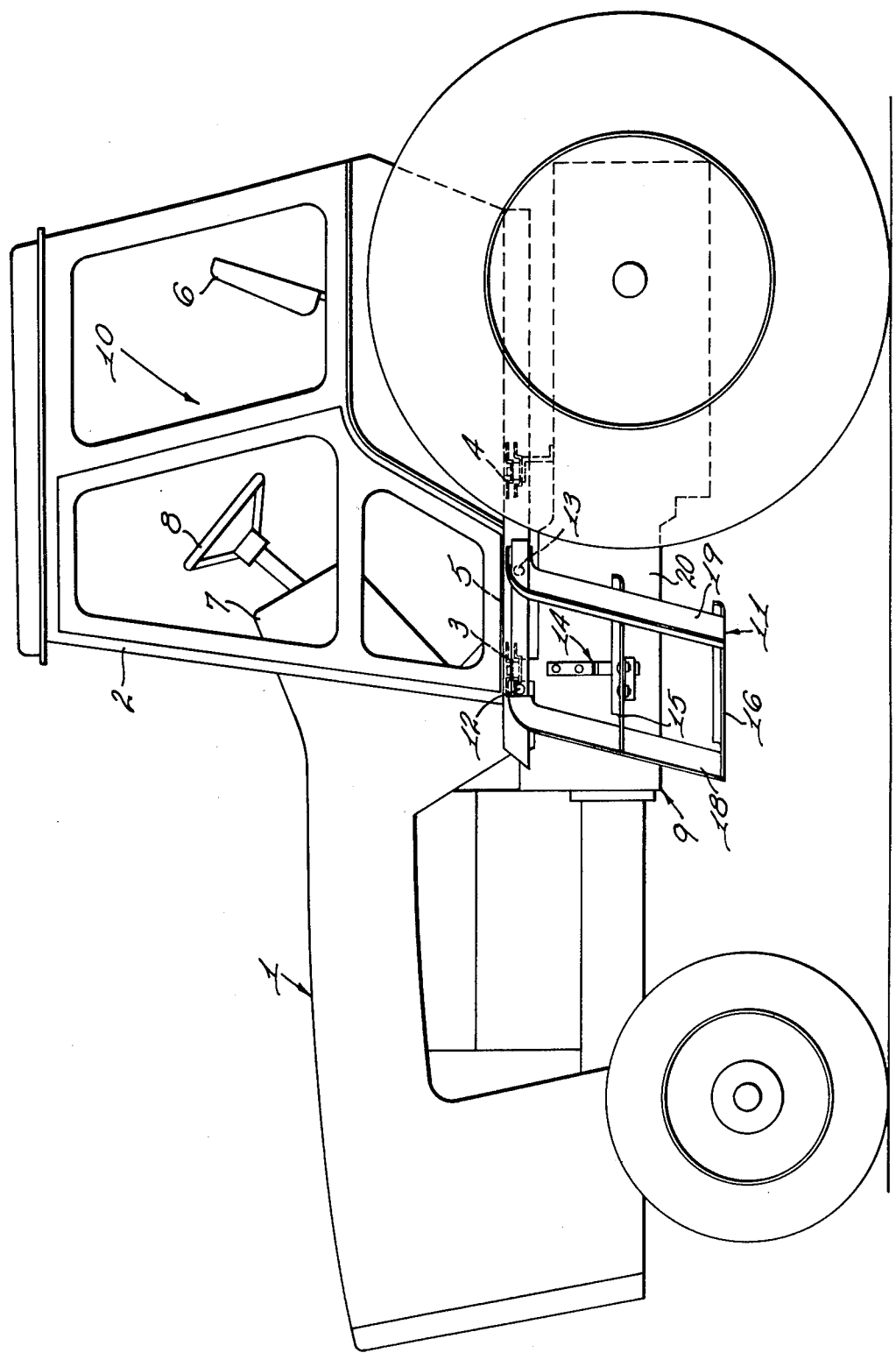

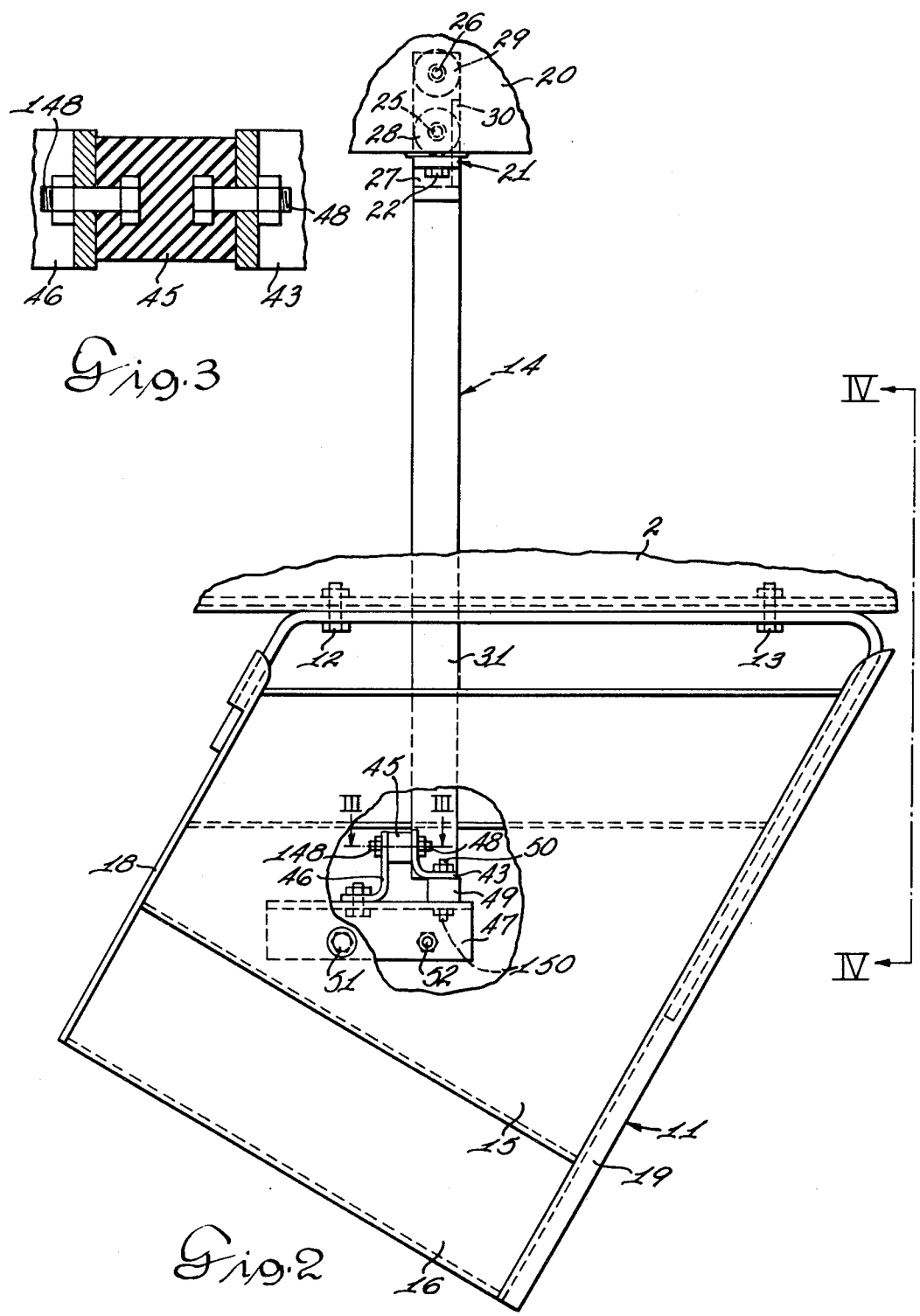

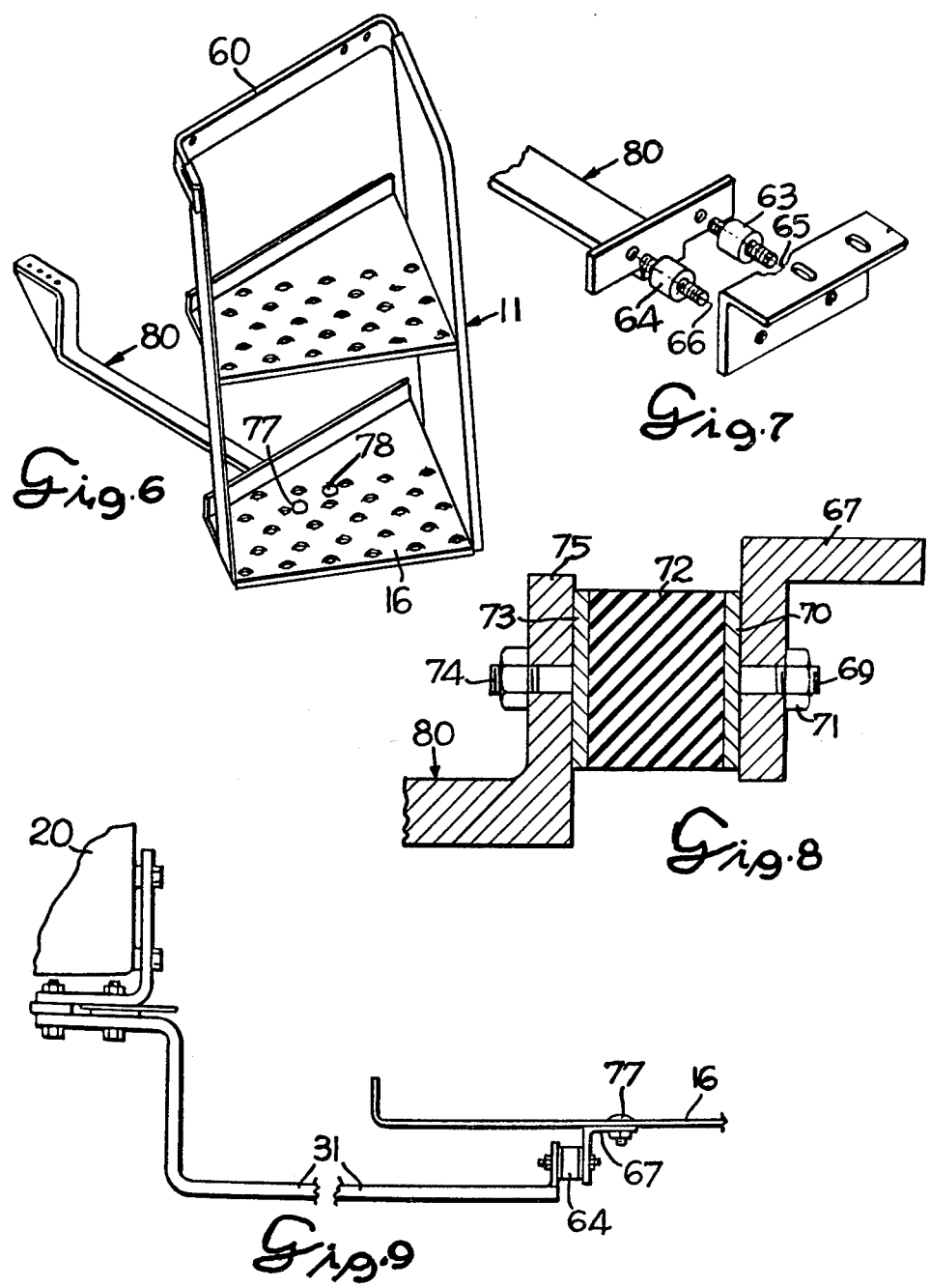

ISOLATED STEP SUPPORT

This invention relates to a step for a tractor and more particularly to an isolated support for a step mounted on an isolated cab to reduce sound transmission from the tractor chassis to the cab and reduce the sound level in the cab by sheer stress of elastomeric isolators. This is a continuation-in-part application of Ser. No. 863,337, filed Dec. 22, 1977.

The larger tractors as presently used are so large that is is difficult to gain access to the cab without the use of steps. Steps are conventionally mounted on the tractor chassis and may tend to increase vibrations and the noise levels in the cab. Mounting of the step on the cab itself even though the cab is isolated from the vehicle chassis may also increase vibrations of the steps and the noise level in the cab. Accordingly, with the cab resiliently mounted on the tractor chassis, a dampening effect is provided through the resilient mounting of the step on the chassis. To insulate the support for the step mounted on the vehicle cab will reduce vibrations of the steps. Accordingly, an isolated step support is provided to reduce vibrations of the step and also decrease the sound level in the cab. This is accomplished through mounting a step support on the vehicle chassis and resiliently supporting the step on the step support.

Accordingly, it is an object of this invention to provide an isolated step on a tractor isolated from the vehicle chassis.

It is another object of this invention to provide a step mounted on an isolated cab and supporting the step through a resilient isolator under sheer stress on a step support mounted on the vehicle chassis to isolate and reduce vibrations of the cab and the step. It is a further object of this invention to provide a step mounted integral with the vehicle cab isolated from the vehicle chassis to reduce the sound level in the vehicle cab.

The objects of this invention are accomplished by mounting a step on a vehicle to gain access to the cab. Mounting the step on the cab which is isolated from the vehicle chassis provides an integral assembly between the cab and the step. The step is suspended from the cab and is also supported on a step support which is mounted through isolating means under sheer stress from the vehicle chassis. The step is supported through resilient means to dampen vibrations in at least two directions to reduce vibrations and reduce the sound level in the cab.

Referring to the drawings, the preferred embodiment of this invention is illustrated.

FIG. 1 illustrates a side elevation view of a tractor with a cab and the step;

FIG. 2 is a plan view partially sectioned to show the mounting of the step on the cab and tractor;

FIG. 3 is a section view taken on line III—III of FIG. 2;

FIG. 6 is a three-dimensional view of the step and the modified step support or stabilizer;

FIG. 7 is a three-dimensional view of a modified connection between the stabilizer for a step and the step and resilient isolators.

FIG. 8 is a cross-section view of one of the isolators.

FIG. 9 is a side elevation view illustrating vibration of the step support carried from the vehicle chassis to the step.

Figure 4:
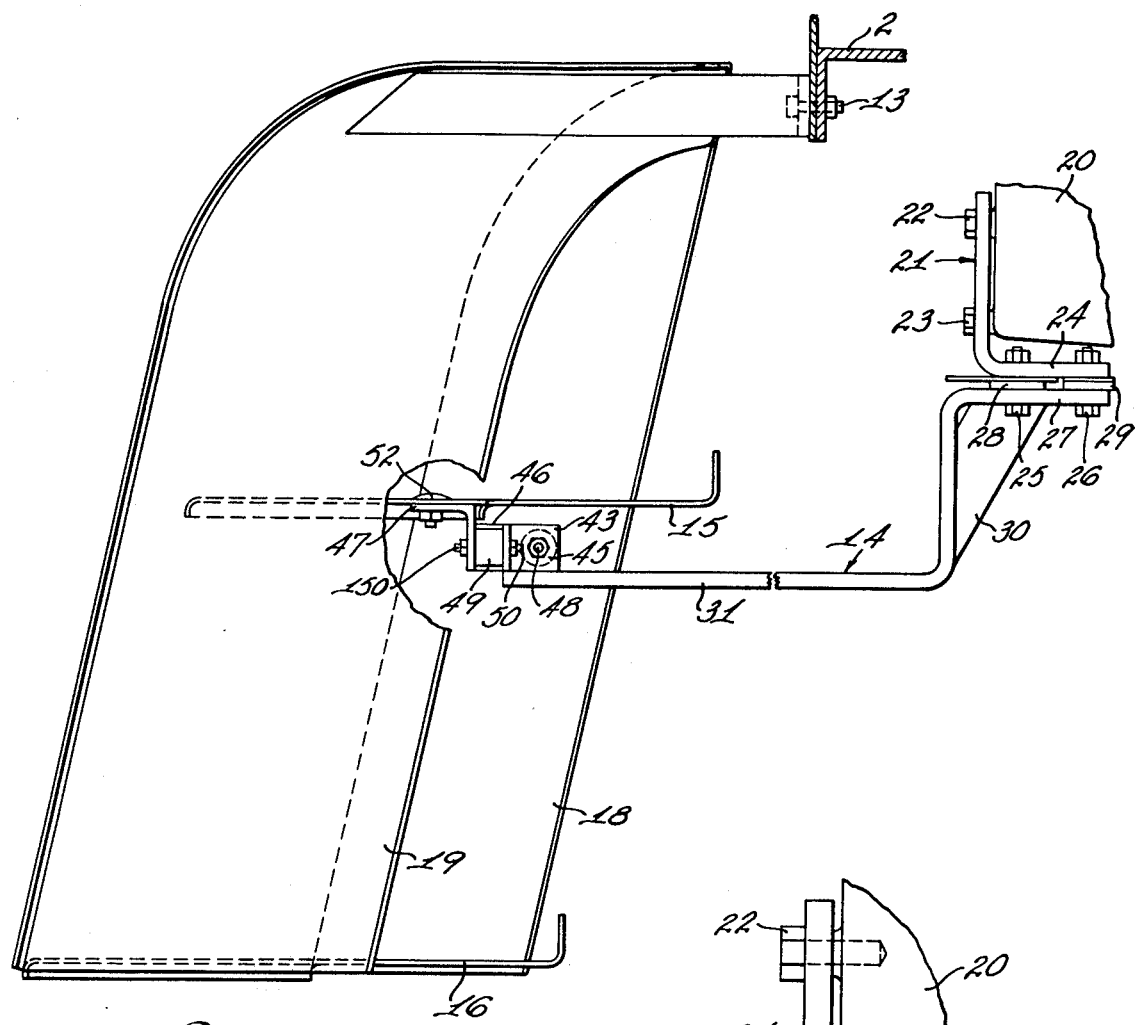
FIG. 4 is a view of the step mounted on the tractor taken on line IV—IV of FIG. 2.
Figure 5:
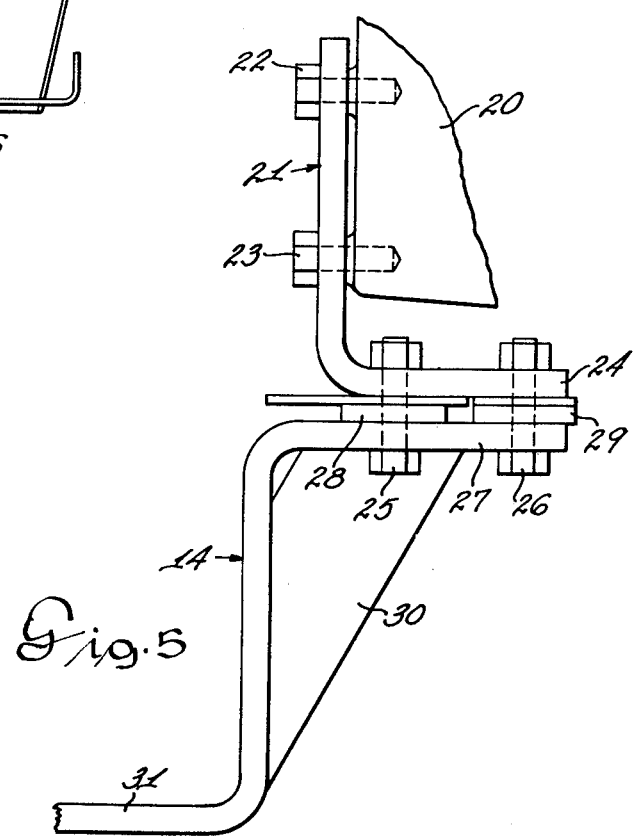
FIG. 5 is an enlarged view of the step support mounting.

Referring to FIG. 1, a tractor 1 is shown with a cab 2 mounted on resilient isolators of which 3 and 4 are shown. The platform 5 and cab 2 define the operator station together with the seat 6, control module 7, and steering wheel 8. The cab 2 and platform 5 are resiliently mounted on the vehicle chassis 9 to dampen vibrations and reduce the sound level at the operator station 10. The step 11 is fastened on the cab by the bolts 12 and 13 and supported by a step support 14. The step 11 includes the two steps 15 and 16 which are mounted between the side plates 18 and 19. The step 11 extends transversely and slightly forwardly of the vehicle cab for convenient access to the cab.

FIG. 2 shows the plan view of the step 11 and FIG. 3 shows a section taken on line III—III of FIG. 2. The transmission housing 20 of the vehicle chassis 9 provides a means for fastening the hanger bracket 21 by means of the screws 22 and 23. The hanger bracket has an L-shaped construction with a horizontal portion 24 carrying the screws 25 and 26 which in turn fasten the step support bracket 27. The screws 25 and 26 extend through the spacers 28 and 29 to provide support for the support bracket 27 on the underside of the horizontal portion 24 of the hanger bracket 21. The support bracket is formed with a gusset 30 to provide stiffness to the brace on the supported portion. A horizontal portion 31 extends beneath the upper step 15 and includes angle 43 fabricated to the supporting end of the step support 14. The angle 43 on the support bracket 31 carries the isolator 45 which is also fastened to the tab 46 of the step carrier 47. The bolts 48 and 148 extend from the rubber isolator to isolate the support bracket 31 from the step carrier bracket 47.

Similarly, the isolator 49 is positioned between the angle 43 of the support bracket 27 and the step carrier bracket 47 and fastened by the bolts 50 and 150. Accordingly, the isolators 45 and 49 isolate the support bracket from the carrier bracket 47. The carrier bracket 47 is fastened by the bolts 51 and 52 to the step 15 from the underside for supporting the step.

Accordingly, the cab 2 is resiliently mounted on the vehicle chassis 9. Sound transmission from the chassis through the rubber isolators 3 and 4 which support the platform 5 and the cab 2 is dampened. The step 11 is integral with the cab and is isolated with the cab from the vehicle chassis 9 by the rubber isolators through isolators 45 and 49.

The step support 14 is supported on the vehicle chassis. Accordingly, the hanger bracket 21 mounted on the transmission housing 20 of the vehicle chassis 9 provides the support for the step support 14. Similarly, the step support 14 extends beneath the upper step 15. The carrier bracket 47 is bolted to the upper step 15. The rubber isolators 45 and 49 mounted between the carrier bracket 47 and the step support 14 reduce sound transmission between the step support 49 and the carrier bracket 47. The rubber isolators 45 and 49 restrain movement and reduce vibrations in the fore and aft direction and the transverse direction between the step support 14 and the step carrier bracket 47. Accordingly, the step and cab as an integral structure are isolated from the vehicle chassis and vibrations of the step are dampened by the step support 14 which is resiliently connected to the step. Accordingly, the step support provides the dual function of supporting the step and also reducing vibrations of the step and vibrations from the chassis to the step as well as reducing the sound level in the cab.

Referring to FIGS. 6, 7 and 8, a step 11 is shown mounted on the stabilizer 80 for the step. The supporting flange 60 is adapted for mounting on the vehicle cab. The step as shown is the same configuration as the step previously shown in the drawings. The step extends transversely and forwardly at an angle to the cab and chassis and also extends downwardly to engage the stabilizer 80. A pair of rubber isolators 63 and 64 are mounted on parallel horizontal axes 65 and 66. Step supporting flange 67 is mounted on the underside of the step pad 16 by means of the bolts 77 and 78. Each of the isolators is constructed in the manner as shown in FIG. 8. The bolt 69 is integral with the plate 70 and fastened to the support bracket 67 by the nut 71. The plate 70 is bonded to the elastomeric element 72. Similarly, the plate 73 is bonded to the elastomeric element 72 and integral with the bolt 74 which extends through the flange 75 on the stabilizer 80.

FIG. 9 illustrates exaggerated physical movement of the stabilizer arm 31 during transmission of vibrations from the chassis 9 to the step 11. The greatest amplitude of oscilation is coincidental with narrowest dimension of the cross section of the stabilizer arm. The vibration transmitted through the isolators of which isolator 64 is shown produces essentially a sheer stress and accordingly greatly reduced vibrations are transmitted through to the step. The isolators 63 and 64 are primarily under a sheer stress, however, some compressive force is applied to the isolator 63 and 64 due to the tendency of the step to pivot about its connection with the vehicle cab 2. The rotational moment produced when the steps are in use due to the weight on the step would cause a transient compressive force on the isolators and produce a compressive stress.

The embodiments of the invention in which an exclusive property or privilege is claimed are defined as follows:

1. A vehicle having an isolated step comprising, a vehicle chassis, a platform, isolators resiliently mounting said platform on said vehicle chassis, a step mounted on said vehicle platform, a stabilizer mounted on said vehicle chassis, isolator means connected between said stabilizer and said step partially supporting said step and dampening vibrations between said stabilizer and said step, said isolator means including fastening means fastened to said stabilizer, securing means secured to said step, and an elastomer consisting of a horizontal elastomeric element extending between said fastening means and said securing means to reduce transmission of vibrations and sound between said stabilizer and said step and provide a cushioned support for said step.

2. A vehicle having an isolated step as set forth in claim 1 wherein, said isolator means includes two isolators.

3. A vehicle having an isolated step as set forth in claim 1 including, two isolators mounted in parallel relationship to each other.

4. A vehicle having an isolated step as set forth in claim 1 including, two isolators mounted in horizontal parallel relationship between said stabilizer and said step.

5. A vehicle having an isolated step as set forth in claim 1 wherein, said isolator means includes at least two isolators mounted in horizontal relationship, a vertical mounting flange on each of said stabilizer and said step, means connecting said isolators on said vertical mounting flanges.

6. A vehicle having an isolated step as set forth in claim 1 wherein, said stabilizer includes a step support bracket, said isolator means includes rubber isolators positioned transversely between said step support bracket and said step dampening vibrations in a transverse direction between said vehicle chassis and said step.

7. A vehicle having an isolated step as set forth in claim 1 wherein, said step defines a supporting structure fastened on said platform, said stabilizer defines a cantilever structure restaining transverse movement of said step while said isolator means attenuates transmission of sound from said chassis to said step.

8. A vehicle having an isolated step as set forth in claim 1 wherein, said step includes means diagonally supporting said step relative to said vehicle chassis, means positioning said isolator means in a transverse position relative to said vehicle chassis.

9. A vehicle having an isolated step support as set forth in claim 1 wherein, said stabilizer defines a cantilever structure extending from said vehicle chassis, means mounting said step in a diagonally forward direction from said vehicle platform, said isolator means including a pair of transverse isolators extending transversely from said stabilizer to said step creating compressive stress from the weight of said step and sheer stress from the transmission of vibrations through said stabilizer to said step.

10. A vehicle having an isolated step as set forth in claim 1 including, means fastening said step on the side of said platform, said stabilizer defining a cantilever structure rigid transversely and less rigid horizontally and vertically whereby said elastomeric element reduces transmission of sound from said stabilizer to said step.

* * * * *